(12) United States Patent
Xie

(10) Patent No.: US 8,294,447 B2
(45) Date of Patent: Oct. 23, 2012

(54) ADVANCED SLOPE INJECTION FOR INPUT CURRENT LIMITING OF SWITCH-MODE DC/DC CONVERTER

(75) Inventor: Manjing Xie, Fremont, CA (US)

(73) Assignee: Intersil Americas Inc., Milpitas, CA (US)

( * ) Notice: Subject to any disclaimer, the term of this patent is extended or adjusted under 35 U.S.C. 154(b) by 660 days.

(21) Appl. No.: 12/428,739

(22) Filed: Apr. 23, 2009

(65) Prior Publication Data

US 2010/0085029 A1 Apr. 8, 2010

Related U.S. Application Data

(60) Provisional application No. 61/103,796, filed on Oct. 8, 2008.

(51) Int. Cl.
*G05F 5/00* (2006.01)
(52) U.S. Cl. .......................................... 323/299; 323/908
(58) Field of Classification Search .......... 323/299–303, 323/901, 908
See application file for complete search history.

(56) References Cited

U.S. PATENT DOCUMENTS

| 5,903,452 | A | 5/1999 | Yang | |
|---|---|---|---|---|
| 5,917,711 | A * | 6/1999 | Shikata et al. | 363/16 |
| 6,177,787 | B1 | 1/2001 | Hobrecht | |
| 6,329,804 | B1 * | 12/2001 | Mercer | 323/315 |
| 6,885,177 | B2 | 4/2005 | Fuki | |
| 7,071,630 | B1 * | 7/2006 | York | 315/224 |
| 7,342,392 | B2 | 3/2008 | Liao | |
| 7,466,110 | B2 * | 12/2008 | Tsuruya | 323/207 |
| 7,479,778 | B1 | 1/2009 | Broach et al. | |
| 7,710,079 | B2 * | 5/2010 | Martin et al. | 320/164 |
| 8,026,707 | B2 * | 9/2011 | Chee | 323/284 |
| 2006/0284607 | A1 | 12/2006 | Isobe | |

* cited by examiner

*Primary Examiner* — Jessica Han
(74) *Attorney, Agent, or Firm* — Howison & Arnott, L.L.P.

(57) ABSTRACT

A DC/DC converter comprising voltage conversion circuitry for generating a regulated output voltage responsive to an input current and at least one switching control signal. A current control loop generates the at least one switching control signal to limit an input current responsive to the input current, a reference voltage and a slope signal injected with the reference voltage.

15 Claims, 5 Drawing Sheets

US 8,294,447 B2

ADVANCED SLOPE INJECTION FOR INPUT CURRENT LIMITING OF SWITCH-MODE DC/DC CONVERTER

CROSS REFERENCE TO RELATED APPLICATION

This application claims priority to U.S. Provisional Application for Patent No. 61/103,796, filed Oct. 8, 2008, and entitled ADVANCED SLOPE INJECTION FOR INPUT CURRENT LIMITING OF SWITCH-MODE DC/DC CONVERTER, the specification of which is incorporated herein in its entirety.

BRIEF DESCRIPTION OF THE DRAWINGS

For a more complete understanding, reference is now made to the following description taken in conjunction with the accompanying Drawings in which.

DETAILED DESCRIPTION

Figure 1:
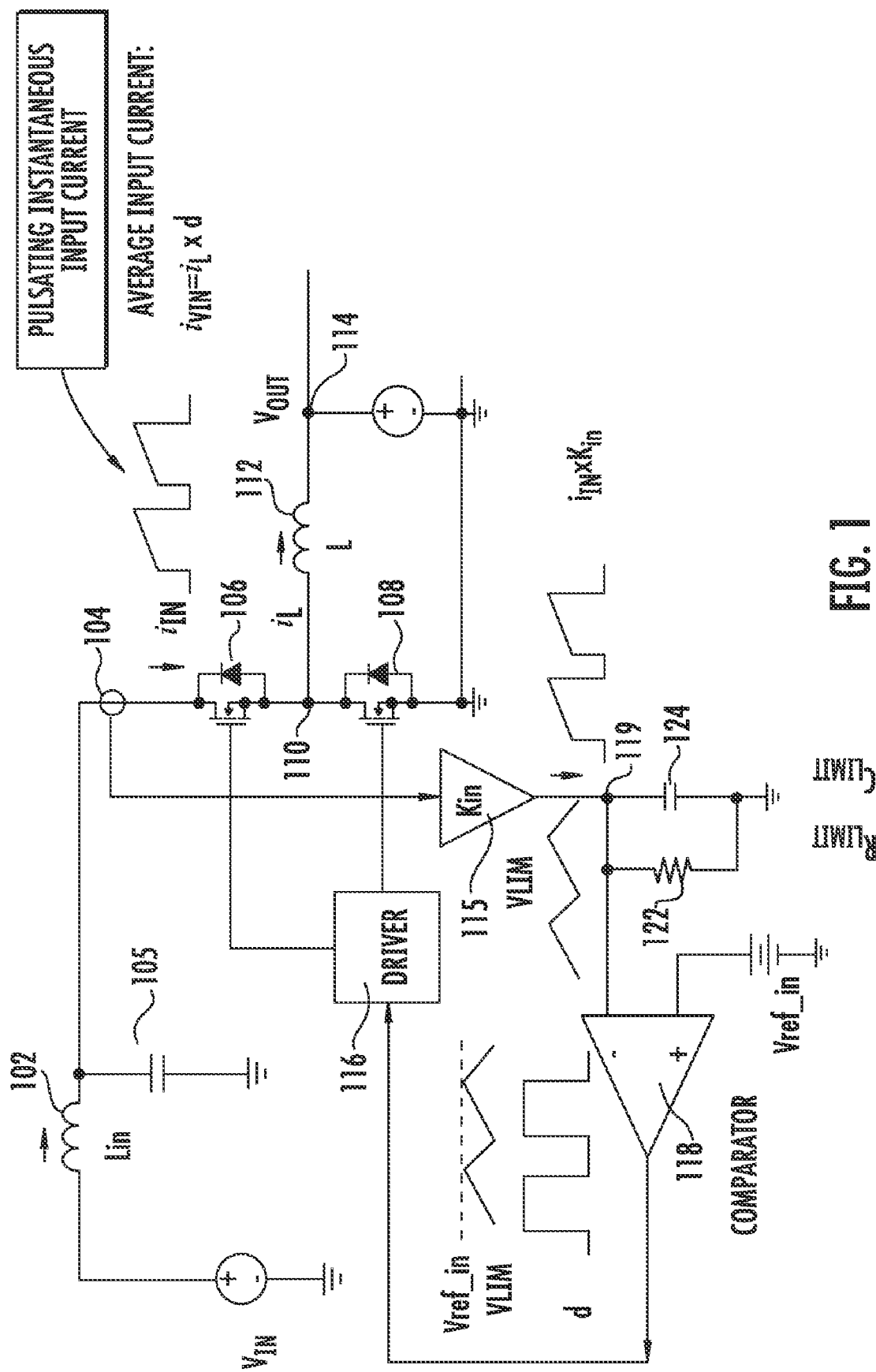
FIG. 1 is a schematic diagram of the circuitry of an input current limit loop.

Referring now to the drawings, wherein like reference numbers are used herein to designate like elements throughout, the various views and embodiments of an advanced slope injection for input current limiting of switch-mode DC/DC converter are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Many applications of consumer electronic products provide power to their interface sockets. This enables many peripherals to have "plug and play" capabilities. The universal serial bus (USB) is the most popular interface that provides power. To provide a host that provides power, it is required that the peripheral device must have the capability to limit the current drawn from the host. DC/DC converters are frequently used to process the power in these peripheral devices. These DC/DC converters are required to have an input current limiting functionality.

To provide the current limiting functionality, the input current must be sensed, fed to a controller and the duty cycle must be adjusted to limit the input current by the controller. Thus, a closed loop control system is formed. This closed loop control system is called the input current limiting loop. For buck converters, inverting buck boost converters, non-inverting buck boost converters and CUK converters, of which the instantaneous input current of the power stage is a pulsating current, an RC filter is used to derive the average input current. Comparing the input current signal to a reference voltage to adjust the duty cycle effectively limits the input current. Since the duty cycle can only be adjusted once in each switching cycle, the switch-mode power supply has an inherent discrete characteristic.

Referring now to FIG. 1, there is illustrated a schematic diagram of the circuitry of the input current loop. The input voltage $V_{IN}$ is applied through an inductor 102 to provide a pulsating instantaneous input current at node 104. Connected between node 104 and ground is a capacitor 105. The input voltage $V_{IN}$ is provided from a host device that powers the connected peripheral. A pair of switching transistors 106 and 108 are connected between node 104 and ground. The drain/source path of transistor 106 is connected between node 104 and the phase node 110. The drain/source path of transistor 108 is connected between node 110 and ground. The gates of each of transistors 106 and 108 are connected to a driver circuit 116. The inductor current $I_L$ passes from the phase node 110 through an inductor 112 to the output voltage node $V_{OUT}$ 114. A capacitor is connected from node 114 to GND. Due to the large capacitance used from node 114 to GND, when the output load is large, the output voltage $V_{OUT}$ at node 114 changes little during current limiting.

The input current limit loop is created by monitoring the input current at node 104. The monitored input current passes through an amplifier 115 having its input connected to node 104 and its output connected to the inverting input of comparator 118 at node 119. The amplifier 115 increases the instantaneous input current $I_{IN}$ by the output factor $K_{IN}$. The output of the amplifier 115 provides a current of $I_{IN} \times K_{IN}$ and provides a limited voltage $V_{LIM}$. An RC network connected between node 119 and ground is used to derive the average input current at any particular point in time. The average current signal, $V_{LIM}$ is compared to a reference voltage $V_{REF\_IN}$ in order to adjust the duty cycle. The RC network consists of a resistor 122 connected between node 119 and ground, and a capacitor 124 is connected in parallel with resistor 122 between node 119 and ground. The output of the comparator 118 comprises the duty cycle signal D which is provided as a driving signal to the driver circuit 116. The driver circuit 116 generates the appropriate control signals to turn on and off transistors 106 and 108 responsive to the duty cycle signal D to limit the input current. The average input current is determined according to the equation $I_{VIN} = I_L \times D$.

The sample and hold effect of a discrete system affects the input current limit loop stability. Furthermore, the stability of the input current limit loop is only determined by the steady state duty cycle of the DC/DC converter. Once oscillation occurs, both the inductor current ripple and the input current ripple become much greater than in stable conditions. These extra large current ripples threaten the stability of the DC/DC converter. First, these extra large current ripples add to the radiated noise and increase inductor core losses and power device power losses. Additionally, extra ripple occurs to the average input current signal too. Uncertain offset is introduced between the reference voltage and the average current signal.

Figure 2:
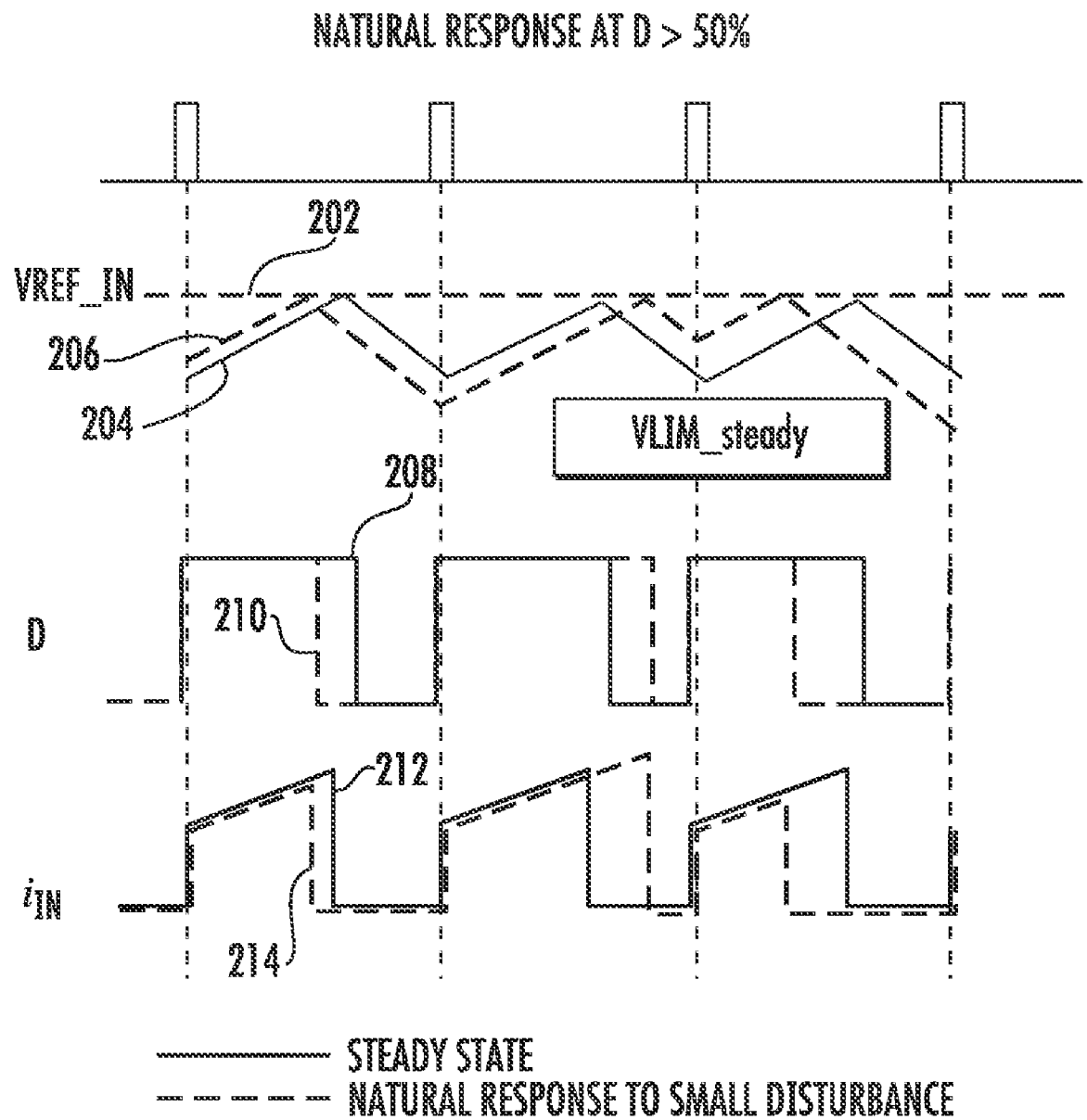
FIG. 2 illustrates the variations in the input current responsive to disturbances in input current.

An illustrations of the effects of small perturbations upon the input current $I_{IN}$, the average current and the duty cycle signal D are more fully illustrated in FIG. 2. FIG. 2 illustrates the reference voltage $V_{REF\_IN}$ 202, the $V_{LIM}$ signal at steady state 204 and the $V_{LIM}$ signal in response to small signal perturbations 206, the duty cycle signal D at steady state 208, the duty cycle signal D responsive to small perturbations 210, the input limited current $I_{IN}$ at steady state 212 and the input current responsive to small perturbations 214. FIG. 2 illustrates the manner in which the oscillations of the duty cycle signal D will grow for duty cycles greater than 50% indicating an unstable system.

The solid lines 204, 208 and 212 represent the steady state response for the average current $V_{LIM}$, the duty cycle D and the input current $I_{IN}$, respectively. The dashed lines 206, 210 and 214 represent the average current $V_{LIM}$, the duty cycle D and the input current responsive to small disturbances within the input current, respectively. As can be seen, when small disturbances occur, the differences between the steady state response of the input current and the response to the disturbed current grows as indicated in the differences between wave forms 212 and 214. These oscillations increase the electromagnetic interference and RF noise within the circuit. There is also an increase in the thermal stresses of the circuit and inductor saturation causes the generations of a large current spike. This will induce an unpredictable DC offset within the input current limit. These oscillations occur once the DC/DC input current enters input current limiting. The oscillations cause a large current ripple at both the input and output.

Figure 3:
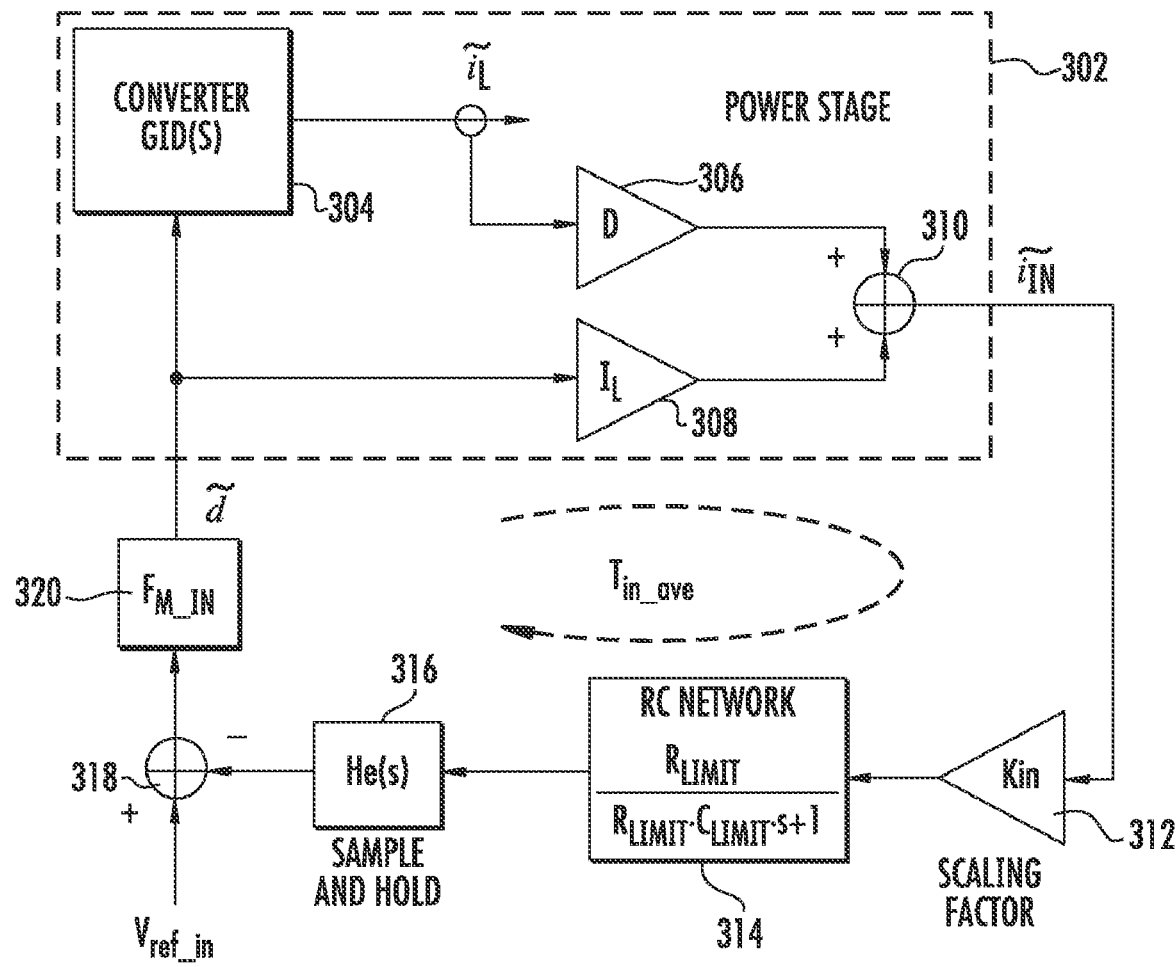
FIG. 3 illustrates a functional block diagram of the input current limit loop.

Referring now to FIG. 3, there is illustrated a functional system block diagram of the input current limit loop. Within the power stage circuitry 302 the converter circuitry 304 generates an inductor current $I_L$. The generated inductor current $I_L$ 308 and the duty cycle D signal 306 are combined at 310 to generate the limited input current $I_{IN}$. Within the current limit loop, the input current $I_{IN}$ is multiplied by the scaling factor 312 and is further controlled by the RC network 314. A sample and hold response of the average input current is compared at 318 with the reference voltage $V_{REF\_IN}$ at 318 generating a modulation gain $F_{M\_IN}$ at 320. The modulation gain $F_{M\_in}$ is equal to $$F_{M\_IN} = \frac{F_{SW}}{S_N},$$

where $S_N$ equals the injected rising slope.

$$S_N = \frac{I_L \times [1-D] \times KIN}{C_{LIMIT}}.$$

Neither capacitance $C_{LIMIT}$ nor KIN would be able to change the loop gain around FSW/2 in order to stabilize the system. The above described loop gain circuitry has instabilities at duty cycles of greater than 50%. The loop gain indicates that the critical points occur at a duty cycle of 50%. The stability of the loop gain is achieved in situations with a duty cycle of below 50%.

Figure 4:
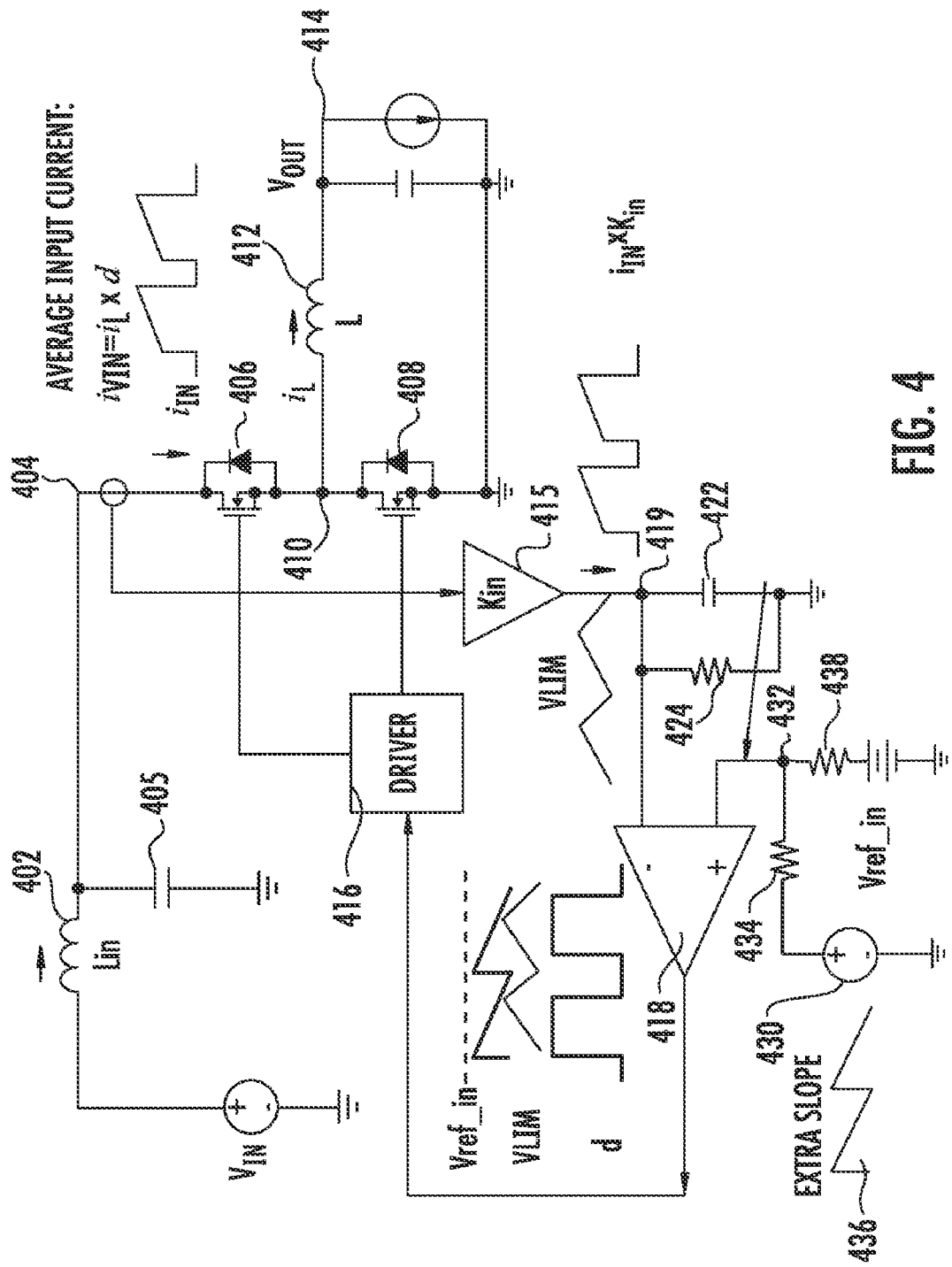
FIG. 4 is a schematic diagram illustrating the circuitry for providing the slope injection within the circuitry of FIG. 1.

In order to overcome the instabilities in oscillations caused by small perturbations within the input current, the use of a slope injection term with the reference voltage $V_{REF\_IN}$ may be utilized as is illustrated in FIG. 4. Referring now to FIG. 4, there is illustrated a schematic diagram of the circuitry of the input current loop. The input voltage $V_{IN}$ is applied through an inductor 402 to provide a pulsating instantaneous input current at node 404. Connected between node 404 and ground is a capacitor 405. The input voltage $V_{IN}$ is provided from host device that powers the connected peripheral. A pair of switching transistors 406 and 408 are connected between node 404 and ground. The drain/source path of transistor 406 is connected between node 404 and the phase node 410. The drain/source path of transistor 408 is connected between node 410 and ground. The gates of each of transistors 406 and 408 are connected to a driver circuit 416. The inductor current $I_L$ passes from the phase node 410 through an inductor 412 to the output voltage node $V_{OUT}$ 414. When the output load is large, the output voltage $V_{OUT}$ at node 414 changes little during current limiting and can be treated as a voltage source.

The input current limit loop is created by monitoring the input current at node 404. The monitored input current passes through an amplifier 415 having its input connected to node 404 and its output connected to the inverting input of comparator 418 at node 419. The amplifier 415 increases the instantaneous input current $I_{IN}$ by the output factor $K_{IN}$. The output of the amplifier 415 provides a current of $I_{IN} \times K_{IN}$ and provides a limited voltage $V_{LIM}$. An RC network connected between node 419 and ground is used to derive the average input current at any particular point in time. An extra slope signal is injected into the non inverting input of comparator 418 by connecting a slope injection voltage source 430 with the non inverting input of the comparator 418 at node 432 through a resistor 434. The extra slope, in one embodiment, may be as illustrated by wave form 436. The reference voltage $V_{REF\_IN}$ is also connected to the non inverting input of comparator 418 at node 432 through a resistor 438. The average current signal, $V_{LIM}$ is compared to a slope injected reference voltage $V_{REF\_IN}$ in order to adjust the duty cycle. The RC network consists of a resistor 424 connected between node 419 and ground. A capacitor 422 is connected in parallel with resistor 424 between node 419 and ground. The output of the comparator 418 comprises the duty cycle signal D which is provided as a driving signal to the driver circuit 416. The driver circuit 416 generates the appropriate control signals to turn on and off transistors 406 and 408 responsive to the duty cycle signal D to limit the input current. The average input current is determined according to the equation $I_{VIN}=I_L \times D$.

Figure 5:
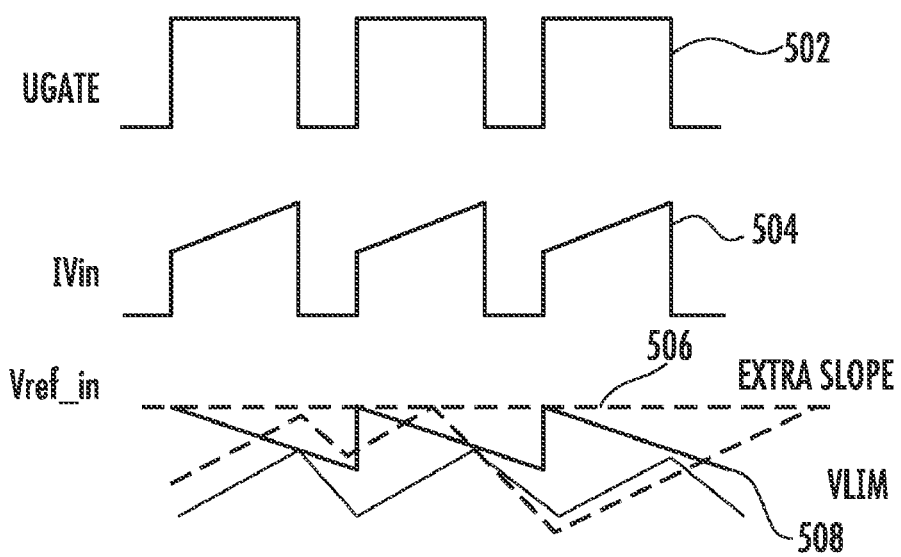
FIG. 5 illustrates the manner in which the reference wave form $V_{REF}$ is altered responsive to the slope injection.

Referring now to FIG. 5, there is illustrated the upper gate duty cycle signal 502, the average input current $I_{VIN}$ 504, the reference voltage 506 and the extra slope signal 508. Referring now back also to FIG. 3, by injecting the slope into the current limit loop the modulation gain equation and rising slope equation will be changed in the following manner:

$$F_{M\_IN} = \frac{F_{SW}}{S_N + S_E}$$

$$S_N = \frac{I_L \times (1-D) \times KIN}{C_{LIMIT}}$$

where modulation gain=$F_{M\_IN}$; rising slope=$S_N$ and injected slope=$S_E$.

Figure 6:
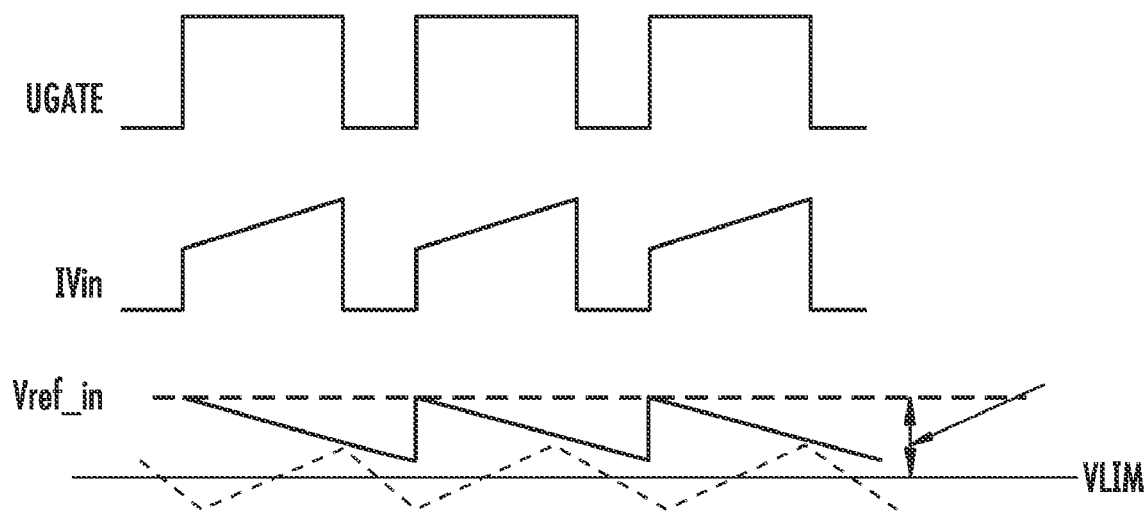
FIG. 6 illustrates the reference wave form $V_{REF}$ including a DC offset.

Referring now to FIG. 6, there is illustrated the manner in which the injection of the slope as illustrated in FIG. 4 provides a DC offset adjustment consisting of the slope compensation ramp offset and the ripple voltage at $V_{LIM}$. The DC offset can be predicted and calculated according to the equations:

$$V_{LIM\_pp} = \frac{1}{C_{Limit}} \cdot I_{IN\_Limit} \cdot k_{in} \cdot (1-D) \cdot T_{SW}$$
$$= \frac{1}{22\,\text{p} \cdot 1.6\,\text{M}} \cdot (1 - 66\%) \cdot 0.5 \cdot 2.6\,\text{u}$$
$$= 12.5\,\text{mV}$$

$$V_{Ramp\_slope} = D \cdot T_{SW} \cdot Se$$
$$= \frac{66\%}{1.6\,\text{MHz}} \cdot 56\,\text{mV/usec}$$
$$= 23.1\,\text{mV}$$

The implementation of FIG. 4 improves the stability of the input current limiting loop for DC/DC converters by injecting an extra slope into the input of the comparator 418 at each switching cycle. The stability is guaranteed without the use of a complicated structure with an error amplifier and compensation network. The design is effective in stabilizing the input current limiting loop for DC/DC converters and reduces EMI and RF noise, improves product reliability and improves current input limiting accuracy. The circuitry is easy to implement and also is applicable to other topologies such as buck boost converters and boost for output current limiting. Prior art only generally analyzes the stability issues of the inductor current feedback. For example, even the so called "D>50%" oscillation is a misleading term. Only the fixed switching frequency peak current mode buck converter displays the D>50% oscillation. The constant on time valley mode current control never incurs such oscillation. On the other hand, the buck converter with switching frequency valley current mode oscillation when D is less than 50%. The DC/DC converter topologies involved in the present disclosure has the input current chopped by the switching rectifier. This chopped current has already been filtered by the RC network and applied to a PWM scheme. Response of the system can be dramatically different than what was described in the prior art.

It will be appreciated by those skilled in the art having the benefit of this disclosure that this advanced slope injection for input current limiting of switch-mode DC/DC converter. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A DC/DC converter, comprising:
    voltage conversion circuitry for generating a regulated output voltage responsive to an input current and at least one switching control signal;
    a current control loop for generating the at least one switching control signal to limit the input current responsive to the input current, a reference voltage and a slope signal injected with the reference voltage, wherein the current control loop further comprises:
        driver circuitry for generating the at least one switching control signal to limit the input current responsive to a duty cycle signal; and
        first circuitry for generating the duty cycle signal responsive to a voltage associated with the input current and a combination of the reference voltage and the injected slope signal, wherein the slope signal is injected into the reference voltage during each switching cycle.

2. The DC/DC converter of claim 1, further including an amplifier for multiplying the input current by a predetermined factor.

3. The DC/DC converter of claim 1, wherein the first circuitry further includes an RC circuit for providing the voltage responsive to the input current.

4. The DC/DC converter of claim 1, wherein the first circuitry further includes a comparator for comparing the voltage associated with the input current with a second voltage comprising the reference voltage having the slope signal injected therein and generating the duty cycle signal responsive thereto.

5. The DC/DC converter of claim 1, wherein the voltage conversion circuitry further includes a pair of switching transistors, each of the switching transistors connected to receive one of the at least one switching control signal.

6. A peripheral device for connection with a host device and drawing a charging current therefrom, the peripheral device comprising:
    voltage conversion circuitry for generating a regulated output voltage responsive to an input current for the host device and at least one switching control signal;
    driver circuitry for generating the at least one switching control signal to limit the input current responsive to a duty cycle signal;
    a comparator for comparing a voltage associated with the input current with a second voltage comprising a reference voltage having a slope signal injected therein and generating the duty cycle signal responsive thereto;
    an RC circuit for providing the voltage responsive to the input current;
    a slope voltage source for generating the slope signal; and
    wherein the RC circuit is connected with an inverting input of the comparator, the reference voltage is connected to the non-inverting input of the comparator and the slope voltage source is connected to the non inverting input of the comparator.

7. The peripheral device of claim 6, further including an amplifier for multiplying the input current by a predetermined factor.

8. The peripheral device of claim 6, wherein the slope signal is injected into the reference voltage during each switching cycle.

9. The peripheral device of claim 6, wherein the voltage conversion circuitry further includes a pair of switching transistors, each of the switching transistors connected to receive one of the at least one switching control signal.

10. A method for current limiting an input current of a DC/DC converter, comprising the steps of:
    generating a regulated output voltage responsive to an input current and at least one switching control signal;
    injecting a slope signal into a reference voltage during each switching cycle of the DC/DC converter;
    generating a duty cycle control signal responsive to the input current and the slope signal injected reference voltage; and
    limiting the input current via the at least one switching control signal responsive to the duty cycle control signal.

11. The method of claim 10, wherein the step of limiting further comprises the step of generating the at least one switching control signal responsive to the duty cycle signal.

12. The method of claim 10, wherein the step of generating a duty cycle control signal further includes the step of multiplying the input current by a predetermined factor.

13. The method of claim 10, wherein the step of generating a duty cycle control signal further includes the step of generating a first voltage responsive to the input current using an RC circuit.

14. The method of claim 13, wherein the step of generating a duty cycle control signal further includes the steps of:
    comparing the first voltage associated with the input current with the slope signal injected reference voltage; and
    generating the duty cycle signal responsive to results of the comparison.

15. A DC/DC converter, comprising:

voltage conversion circuitry for generating a regulated output voltage responsive to an input current and at least one switching control signal;

a current control loop for generating the at least one switching control signal to limit the input current responsive to the input current, a reference voltage and a slope signal injected with the reference voltage; and a slope voltage source for generating the slope signal injected with the reference voltage during each duty cycle of the voltage conversion circuitry.

* * * * *